United States Patent
Kawada et al.

(10) Patent No.: US 6,836,085 B2
(45) Date of Patent: Dec. 28, 2004

(54) METHOD AND APPARATUS OF CONTROLLING ELECTRIC VEHICLE

(75) Inventors: Akiyoshi Kawada, Tokyo (JP); Toshiaki Uwabu, Nagoya (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 49 days.

(21) Appl. No.: 10/254,586

(22) Filed: Sep. 26, 2002

(65) Prior Publication Data

US 2003/0057003 A1 Mar. 27, 2003

(30) Foreign Application Priority Data

Sep. 27, 2001 (JP) ........................................ 2001-295229

(51) Int. Cl.[7] .............................. H02P 1/00; H02P 3/00; H02P 5/00
(52) U.S. Cl. ........................ 318/139; 318/430; 318/432; 318/434; 318/254; 318/700; 318/440; 318/720
(58) Field of Search ......................... 318/138.439, 440, 318/139, 430, 432, 434, 700, 254, 720

(56) References Cited

U.S. PATENT DOCUMENTS

| | | | | |
|---|---|---|---|---|
| 3,855,512 A | * | 12/1974 | Konrad ........................ | 318/366 |
| 3,959,701 A | * | 5/1976 | Bader ......................... | 318/139 |
| 5,453,930 A | * | 9/1995 | Imaseki et al. ............... | 701/22 |
| 5,508,924 A | * | 4/1996 | Yamashita .................... | 701/22 |
| 5,568,024 A | * | 10/1996 | Suzuki ....................... | 318/139 |
| 5,877,601 A | * | 3/1999 | Obara et al. ................. | 318/139 |
| 5,880,570 A | * | 3/1999 | Tamaki et al. ............... | 318/700 |
| 5,914,582 A | * | 6/1999 | Takamoto et al. ........... | 318/801 |
| 6,046,553 A | * | 4/2000 | Matsunaga et al. .......... | 318/139 |
| 6,236,172 B1 | * | 5/2001 | Obara et al. ................. | 318/139 |

FOREIGN PATENT DOCUMENTS

JP   03-253202   * 11/1991   ............. B06L/9/18

OTHER PUBLICATIONS

Meidensha Company Journal 222 (1992) No. 1, p. 43.
Special Issue on General Research [Energy & Control], Technology of Driving High Performance Electric Vehicle, Meidensha Company Journal 231 (1993) No. 4, p. 15–17.

* cited by examiner

*Primary Examiner*—David Martin
*Assistant Examiner*—Tyrone W. Smith
(74) *Attorney, Agent, or Firm*—Foley & Lardner LLP (57) ABSTRACT

A method controls an electric vehicle which is so constituted as to drive a synchronous motor by way of a switch and an inverter circuit. A battery acts as a source of driving a controlling power. The synchronous motor has a permanent magnet acting as an outer rotor. The method includes the following operations of:

1) detecting that the electric vehicle has an acceleration signal of zero;
2) detecting that an actual speed of the electric vehicle is less than a predetermined percent of a rated speed;
3) supplying a current to a winding of a fixed phase of the synchronous motor, by way of the inverter circuit; and
4) generating a braking force.

12 Claims, 5 Drawing Sheets

FIG. 1

CONSTRUCTION OF CONTROLLING ELECTRIC VEHICLE

BRAKING TORQUE GENERATED WHEN FIXED PHASE IS ENERGIZED

FIG. 5

CURRENT OF SYNCHRONOUS MOTOR 14 WHEN SHORT CIRCUIT IS CAUSED TO NEGATIVE POLES OF INVERTER CIRCUIT 13 (FIRST EMBODIMENT)

FIG. 6

SECOND EMBODIMENT

FIG. 7

RELATED ART

METHOD AND APPARATUS OF CONTROLLING ELECTRIC VEHICLE

BACKGROUND OF THE INVENTION

1. Field of the Invention

The present invention relates to a method and an apparatus of controlling an electric vehicle.

2. Description of the Related Art

Figure 7:
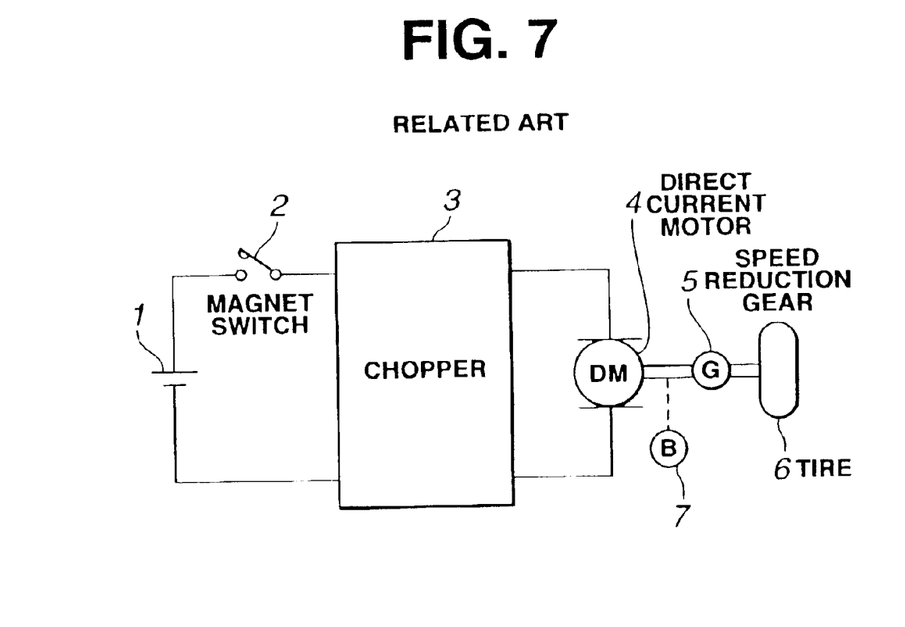
FIG. 7 shows a construction of an apparatus of controlling an electric vehicle, according to a related art.

FIG. 7 shows a schematic of construction of an electric vehicle in commercial use. A chopper 3 connects to a battery 1 by way of a magnet switch 2. A battery voltage is converted from direct current (hereinafter referred to as "DC") to DC by the chopper. Then, the thus converted voltage is supplied to a direct current motor 4 which is subjected to control. The direct current motor 4 has a rotary shaft connecting to a tire 6 by way of a speed reduction gear 5. Also shown in FIG. 7 includes an electromagnetic brake 7.

During travel, the electric vehicle may take the following operations:

1. The magnet switch 2 is turned on.
2. Conductivity (continuity) of the chopper 3 varies in accordance with an angle of an accelerator (not shown in FIG. 7).
3. The voltage applied to the direct current motor 4 varies according to the conductivity of the chopper 3, thus controlling the direct current motor 4 during travel of the electric vehicle.

For achieving the operations described above, the magnet switch 2 keeps turned on during travel of the electric vehicle.

For stopping the electric vehicle, the driver stops operating the accelerator, to thereby reduce the direct current motor 4 in speed. Then, the direct current motor 4 reaching substantially 0 in speed opens an exciting coil of the electromagnetic brake 7, thus generating a braking force (torque) to a brake system for allowing the electric vehicle to make a complete stop. Together with the stop of the electric vehicle, the chopper 3 stops operation.

In other words, during stop of the electric vehicle, opening the exciting coil of the electromagnetic brake 7 allows an exciting current to become 0, allowing the electromagnetic brake 7 to have a spring force for braking operation.

During travel of the electric vehicle, the construction according to the related art in FIG. 7 requires energization of the exciting coil of the electromagnetic brake 7, so as to release the braking force (torque) caused by the spring force. In consideration of fail safe, the above description is required for securing the braking force (torque) for the electromagnetic brake 7, so as to prevent a possible failure of the electromagnetic brake 7 and a control circuit.

Thereby, the electric vehicle having the battery 1 as a driving power source has to continuously keep supplying exciting current to the electromagnetic brake 7 during travel of the electric vehicle. Power consumption attributable to the continuous supply of the exciting current to the electromagnetic brake 7 is about 30% of a motor current consumed when the electric vehicle is making a flat traveling. Considering energy efficiency, the figure 30% is not ignorable (minor).

The direct current motor 4 is preferred as small as possible. For generating a great force (torque) with the direct current motor 4 that is small in size, there is provided the speed reduction gear 5 (gear type). Setting the speed reduction gear 5 is responsible for greater capacity of the battery 1, which is also disadvantageous in terms of efficiency as well as energy saving.

Diminishing the gear of the speed reduction gear 5 in size may damage the teeth of the gear. In this case, the electric vehicle may be inconvenient especially for those who are physically disabled or weak, for the following causes:

* The braking force (torque) is applied to the rotary shaft of the direct current motor 4 in such a manner that a great braking force (torque) can be generated by a small braking force. Therefore, the damage of the teeth of the gear of the speed reduction gear 5 may cause inability in securing the braking force (torque) of the electromagnetic brake 7.

BRIEF SUMMARY OF THE INVENTION

It is an object of the present invention to provide a method and an apparatus of controlling an electric vehicle.

It is another object of the present invention to provide the method and the apparatus of controlling the electric vehicle that is advantageous especially to those who are physically disabled or weak.

According to a first aspect of the present invention, there is provided a method of controlling an electric vehicle which is so constituted as to drive a synchronous motor by way of a switch and an inverter circuit. A battery acts as a source of driving a controlling power. The synchronous motor has a permanent magnet acting as an outer rotor. The method comprises the following operations of:

1) detecting that the electric vehicle has an acceleration signal of zero;
2) detecting that an actual speed of the electric vehicle is less than a predetermined percent of a rated speed;
3) supplying a current to a winding of a fixed phase of the synchronous motor, by way of the inverter circuit; and
4) generating a braking force.

According to a second aspect of the present invention, there is provided an apparatus of controlling an electric vehicle, comprising:

1) a battery acting as a source of driving a controlling power;
2) a synchronous motor connected to the battery by way of a switch, the synchronous motor having a permanent magnet acting as an outer rotor and having a position detector; and
3) an inverter circuit interposed between the synchronous motor and the battery, the inverter circuit including a controller which outputs a control signal for controlling the synchronous motor.

The controller comprises:

a) a brake speed detector receiving a speed signal and an acceleration signal of the electric vehicle, and carrying out a first detection for detecting that the acceleration signal is zero and a second detection for detecting that an actual speed of the electric vehicle is less than a predetermined percent of a rated speed;
b) an optimum current command operator receiving the first detection and the second detection carried out by the brake speed detector, and setting up a current signal for generating a braking torque; and
c) a pulse width modulation signal generator receiving the first detection and the second detection carried out by the brake speed detector, and selecting a switching element of a fixed phase of the inverter circuit.

The other objects and features of the present invention will become understood from the following description with reference to the accompanying drawings.

DETAILED DESCRIPTION OF THE EMBODIMENT

In the following, various embodiments of the present invention will be described in detail with reference to the accompanying drawings.

Figure 1:
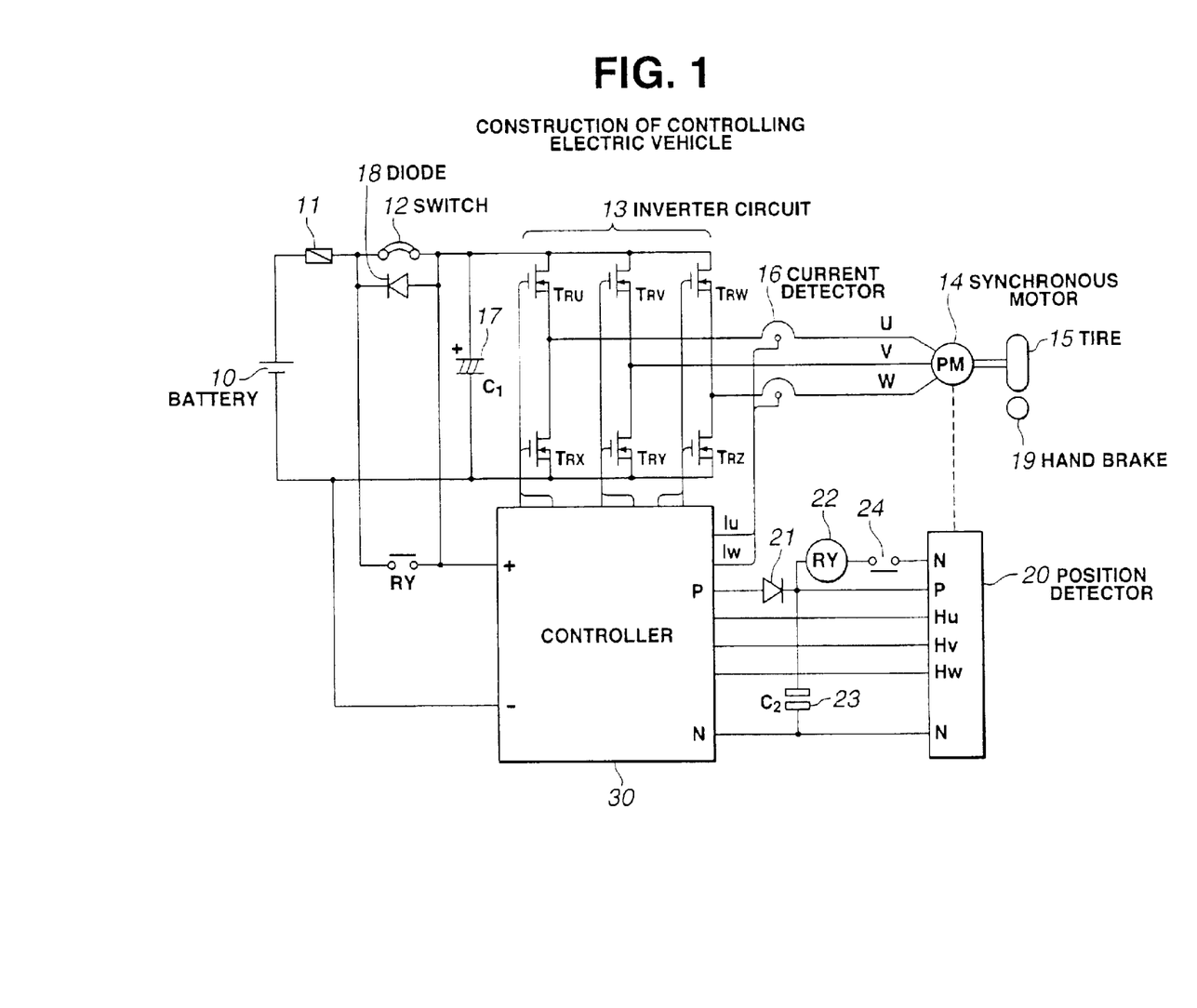
FIG. 1 shows a construction of an apparatus of controlling an electric vehicle, according to a first embodiment of the present invention.

As is seen in FIG. 1, there is provided a construction of an apparatus of controlling an electric vehicle, according to a first embodiment of the present invention.

In FIG. 1, a battery 10 acting as a power source connects to an inverter circuit 13 by way of a fuse 11 and a switch 12 (such as breaker, key switch and the like). The inverter circuit 13 is constituted of three phases, including a switching element TRU, a switching element TRV, a switching element TRW, a switching element TRX, a switching element TRY and a switching element TRZ. A first arm connecting the switching element TRU and the switching element TRX has a first bridge contact connecting to a phase terminal U of a synchronous motor 14. A second arm connecting the switching element TRV and the switching element TRY has a second bridge contact connecting to a phase terminal V of the synchronous motor 14. A third arm connecting the switching element TRW and the switching element TRZ has a third bridge contact connecting to a phase terminal W of the synchronous motor 14. The synchronous motor 14 is of 3-phase type and has a permanent magnet 46 (to be described more in detail afterward referring to FIG. 3) as outer rotor. The outer rotor of the synchronous motor 14 is of a direct drive type which is embedded in a wheel 45 (to be described afterward referring to FIG. 3). The permanent magnet 46 is made of rare earth element featuring a high performance. The synchronous motor 14 is small in size and generates a great force (torque).

There is provided a current detector 16 which connects to the phase terminal U and the phase terminal W. There is provided a smoothing capacitor 17 for the inverter circuit 13. The smooth capacitor 17 and the inverter circuit 13 are in parallel with the battery 10. There is provided a diode 18 connecting in parallel with the switch 12. There is provided a position detector 20 made of a Hall element 49 (to be described more in detail referring to FIG. 3). The position detector 20 detects a position of the permanent magnet 46 (outer rotor) of the synchronous motor 14. The position detector 20 outputs a position signal Hu, a position signal Hv and a position signal Hw which are used for switching polarity of a current in the synchronous motor 14. The switching operation by the position detector 20 is carried out by way of a controller 30 and the inverter circuit 13. In other words, the Hall element 49 of the position detector 20 is a detector element used for switching the polarity of the current in the synchronous motor 14, corresponding to the position of the permanent magnet 46 (outer rotor).

Moreover as is seen in FIG. 1, there are provided a first power source terminal P, a second power source terminal N, a diode 21, a relay 22 and a contact 24. The relay 22 in series with the contact 24 is connected between the first power source terminal P and the second power source terminal N. Energizing the relay 22 can turn on a contact RY of the relay 22, to thereby allow the battery 10 to supply a voltage to the controller 30 for controlling purpose.

Hereinabove, the contact 24 is a switching element which can be turned on when the switch 12 is turned off. Thereby, when the electric vehicle is travelling with the switch 12 turned on, the relay 22 is deenergized.

There is provided a double layer capacitor 23 which can be a general electrolytic capacitor. The double layer capacitor 23 has the following features (advantages): 1. Great electrostatic capacity. 2. Low impedance generating heavy current. 3. Small in size. 4. Light in weight. 5. Longevity. 6. Rechargeable in a short time.

Figure 2:
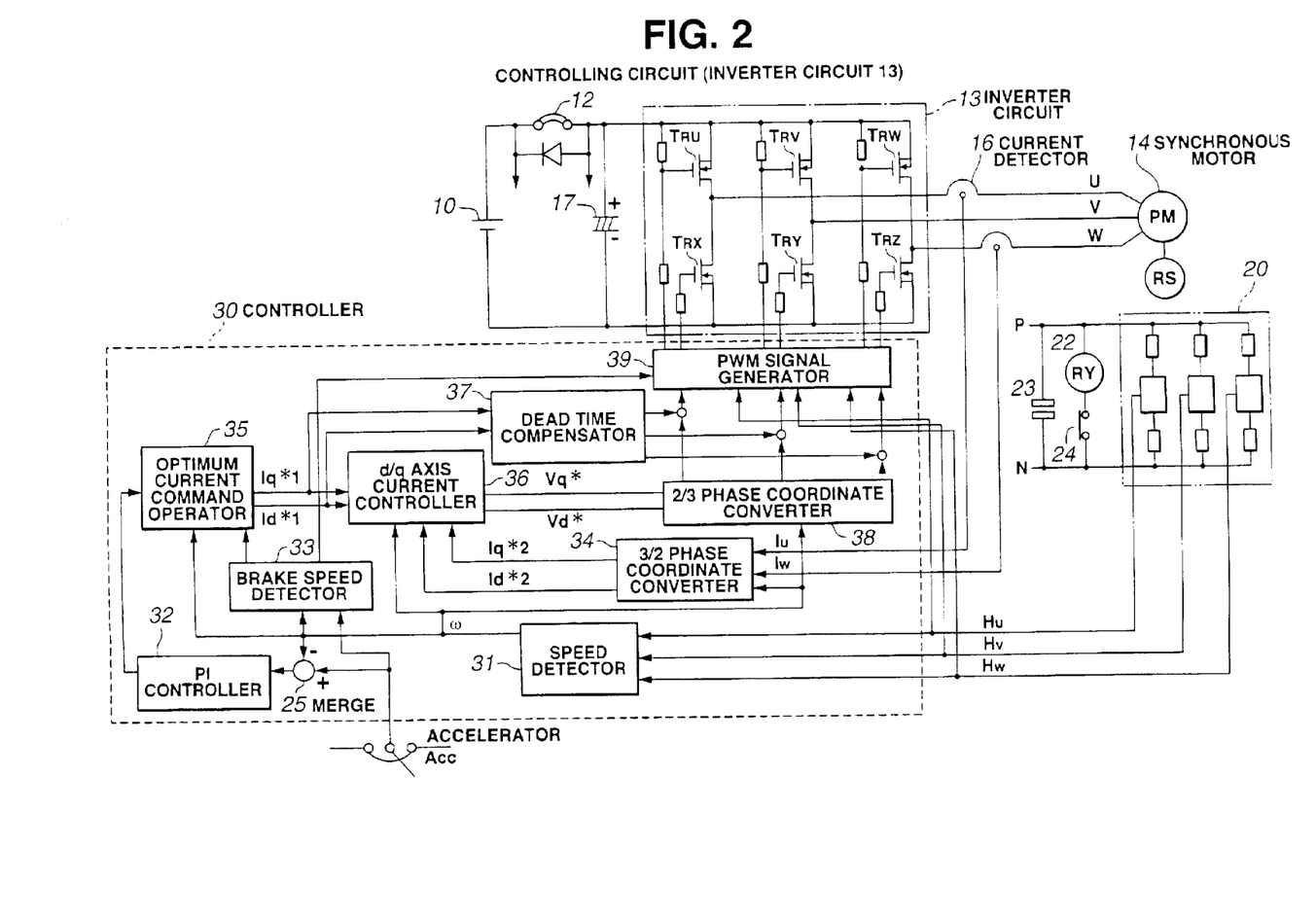
FIG. 2 shows a construction of a controlling circuit (inverter circuit 13)

The controller 30 is a microcomputer. As is seen in FIG. 2, the controller 30 is constituted of a speed detector 31, a proportional integral controller 32 (hereinafter referred to as "PI controller 32"), a brake speed detector 33, a 3/2 phase coordinate converter 34, an optimum current command operator 35, a d/q-axis current controller 36, a dead time compensator 37, a 2/3 phase coordinate converter 38, and a pulse width modulation signal generator 39 (hereinafter referred to as "PWM signal generator 39").

The speed detector 31 receives the position signal Hu, the position signal Hv and the position signal Hw from the position detector 20.

The PI controller 32 receives an acceleration signal corresponding to an angle of an accelerator Acc (accelerator pedal).

The brake speed detector 33 receives the acceleration signal from the accelerator Acc, and a speed signal ω from the speed detector 31. The brake speed detector 33 has the following function:

After the acceleration signal becomes 0, an actual speed of the electric vehicle may become less than a predetermined % of a rated speed (Herein, the predetermined % is 10%. Preferably, the predetermined % is in a range from 5% to 8%. More preferably, the predetermined % is 5%). The brake speed detector 33 detects the above actual speed that does not cause any influence on a driver of the electric vehicle even when the driver makes a sudden stop at the actual speed.

The 3/2 phase coordinate converter 34 receives the speed signal ω from the speed detector 31, and a current signal Iu and a current signal Iw from the current detector 16, and then converts them from 3-phase coordinate to 2-phase coordinate.

The optimum current command operator 35 operates a current command after receiving the speed signal ω from the speed detector 31, a brake detection signal from the brake speed detector 33, and a torque command from the PI controller 32.

The d/q-axis current controller 36 controls a d/q-axis current after receiving the following signals:

1. A current signal Id*1 and a current signal Iq*1 from the optimum current command operator 35.

2. The speed signal ω from the speed detector 31.
3. A current signal Id*2 and a current signal Iq*2 from the 3/2 phase coordinate converter 34.

The battery 10 (control power source) supplies the controller 30 with a controlling power by way of a terminal which is disposed at the switch 12 and disposed on an opposite side to the battery 10.

Even when the switch 12 is open, the controlling power can be supplied by way of the contact RY of the relay 22.

Figure 3:
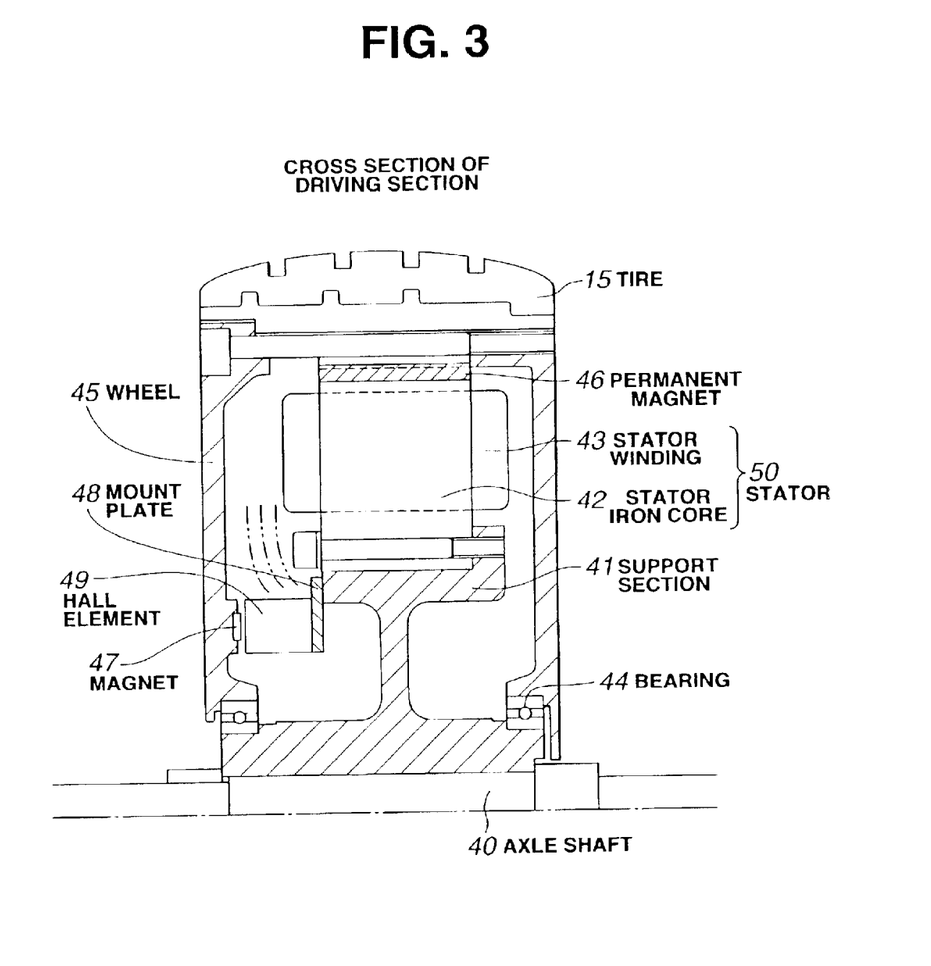
FIG. 3 shows a cross section of a driving section.

As is seen in FIG. 3, there is provided a cross section of a driving section including the synchronous motor 14.

There is provided an axle shaft 40 to which a support section 41 is fixed. There is provided a stator iron core 42 which is fixed to the support section 41. The stator iron core 42 has an outer periphery formed with a slot. A stator winding 43 is disposed in the slot. Hereinafter, the stator iron core 42 and the stator winding 43 are in combination referred to as a stator 50. There are also provided a bearing 44 and the wheel 45. The wheel 45 is fitted to the bearing 44 in such a manner as to wrap a fixed side of the stator 50 and the like. The permanent magnet 46 (outer rotor) is disposed circumferentially around the stator iron core 42, defining therebetween a gap. N-poles and P-poles of the permanent magnet 46 are arranged alternately. In sum, the permanent magnet 46 (outer rotor) and the stator 50 constitute the 3-phase type synchronous motor 14.

In addition, there is provided a tire 15 which is fitted to the wheel 45 on an outer periphery of the permanent magnet 46. There is provided a mount plate 48 to draw in a terminal of the stator winding 43 which is disposed in the slot of the stator iron core 42. The Hall element 49 of the position detector 20 is also fixed to the mount plate 48. There is provided a magnet 47 which is disposed on an inside (of the wheel 45) opposing the Hall element 49.

Described hereinafter is operation of the apparatus of controlling the electric vehicle, according to the first embodiment of the present invention.

For driving the electric vehicle, the following operations can be taken:
1. Turn on the switch 12.
2. The voltage is applied to the inverter circuit 13 by way of the fuse 11, the switch 12 and the smoothing capacitor 17. In addition, a power supply voltage is applied to the controller 30 by way of the fuse 11 and the switch 12.

In the above state, the driver steps on the accelerator Acc. Then, the acceleration signal is outputted to the PI controller 32.

At a starting time point of the electric vehicle, the speed signal ω is 0. Thereby, the acceleration signal is inputted to the PI controller 32 with no modification, to thereby calculate the torque command.

On the other hand, when the electric vehicle is travelling, the position detector 20 detects the position signal Hu, the position signal Hv and the position signal Hw which are inputted to the speed detector 31 of the controller 30 so as to obtain the speed signal ω. At a merge 25 as is seen in FIG. 2, the thus obtained speed signal ω is added to the acceleration signal from the accelerator Acc. The thus obtained differential (deviation) signal is inputted to the PI controller 32, to thereby calculate the torque command which is then outputted to the optimum current command operator 35.

The speed signal ω is also inputted to the optimum current command operator 35. Thereby, the torque command and the speed signal ω contribute to calculation of an optimum current. Then, the optimum current command operator 35 makes a conversion to two axes, that is, the current signal Id*1 (magnetic flux element current Id*1) and the current signal Iq*1 (torque element current Iq*1). Then, the thus converted current signal Id*1 and the current signal Iq*1 are outputted to the dead time compensator 37 and the d/q-axis current controller 36.

As is seen in FIG. 2, the d/q-axis current controller 36 receives the speed signal ω from the speed detector 31 and a current signal Id*2 and a current signal Iq*2 from the 3/2 phase coordinate converter 34, to thereby calculate a 2-axis voltage, that is, a voltage signal Vd* and a voltage signal Vq*. The thus calculated voltage signal Vd* and a voltage signal Vq* are outputted to the 2/3 phase coordinate converter 38 for conversion to three phases. Then, turning "on" or "off" each of the switching element TRU, the switching element TRV, the switching element TRW, the switching element TRX, the switching element TRY and the switching element TRZ of the inverter circuit 13 can supply the current to the synchronous motor 14.

The synchronous motor 14 is of 3-phase type and has the permanent magnet 46 as outer rotor. In other words, turning the synchronous motor 14 can turn the permanent magnet 46, to thereby generate an attraction and repulsion between the permanent magnet 46 and the stator winding 43. Positioning the permanent magnet 46 (outer rotor) by means of the thus generated attraction and repulsion can switch directions of the current flowing in the stator winding 43, to thereby keep rotation of the permanent magnet 46 (outer rotor).

The current of the synchronous motor 14 can be detected by the current detector 16 which connects to the phase terminal U and the phase terminal W. The thus detected current can be fedback to the 3/2 phase coordinate converter 34 respectively as the current signal Iu and the current signal Iw.

The above description sums up outline of the operation of the apparatus of controlling the electric vehicle.

Hereinafter described is operation for solving inconveniences of the conventional electric vehicle.

When the acceleration signal (input) becomes 0, the controller 30 of the inverter circuit 13 carries out controlling operation by calculating the torque command for speed reduction, so as to generate a braking force (torque). As a result, the synchronous motor 14 is reduced in speed (rotation).

Then, the brake speed detector 33 detects that the actual speed of the electric vehicle is less than the predetermined % of the rated speed (Herein, the predetermined % is 10%. Preferably, the predetermined % is in a range from 5% to less than 8%. More preferably, the predetermined % is 5%). The thus detected brake detection signal is outputted to the optimum current command operator 35. In addition to this operation, the thus detected brake detection signal is outputted to the PWM signal generator 39 as a fixed phase conductive signal.

The optimum current command operator 35 defines the current signal Iq*1 as a braking force (torque) current, so as to generate an optimum braking force (torque) current.

On the other hand, the PWM signal generator 39 selects, for example, only the switching element TRU, the switching element TRY and the switching element TRZ of the inverter circuit 13, and then turns on the switching element TRU, the switching element TRY and the switching element TRZ thus selected. With this, the current can flow in the stator winding 43 of a fixed phase of the synchronous motor 14, to thereby generate the braking force (torque).

The thus generated braking force (torque) can be maximized when a polarity of a magnetic flux of the stator iron core 42 faces a reversed polarity of the permanent magnet 46 (outer rotor). In this case, the attraction between the stator 50 and the permanent magnet 46 (outer rotor) is maximized, to thereby stop rotation of the permanent magnet 46 (outer rotor).

Figure 4:
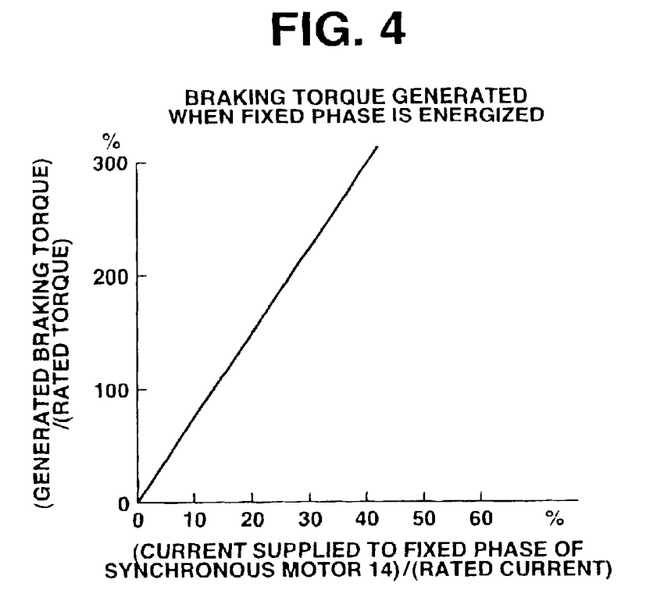
FIG. 4 shows a graph of braking force (torque) generated when fixed phase is energized.

FIG. 4 shows a graph of the braking force (torque) generated when the fixed phase of the synchronous motor 14 is energized. The ordinate of the graph in FIG. 4 is the generated braking force (torque) divided by a rated torque, while the abscissa of the graph in FIG. 4 is the current supplied to the fixed phase of the synchronous motor 14 divided by a rated current. As is obvious from FIG. 4, the braking force (torque) generated when the fixed phase of the synchronous motor 14 is energized is substantially in proportion to the current supplied to the synchronous motor 14.

When the permanent magnet 46 (outer rotor) makes a stop, such state can be detected (determined) when the position signal (namely, the position signal Hu, the position signal Hv and the position signal Hw) shows no variation.

Therefore, selecting the switching element (namely, the switching element TRU, the switching element TRV, the switching element TRW, the switching element TRX, the switching element TRY and the switching element TRZ) of the inverter circuit 13 in accordance with road condition and switching the thus selected switching element can help minimize the current which is energized to the fixed phase, thus saving the energy during the controlling operation.

Hereinabove, only the switching element TRU is selected from the power supply side {although the switching element TRY and the switching element TRZ which are disposed on the negative arm (pole) are turned on}. Switching the switching element TRU can control the current, to thereby keep the electric vehicle stopped.

After the electric vehicle is stopped electrically as described above, the driver may lock the wheel 45 with a hand brake 19, and thereby turn off the switch 12 (open). With this, the current is not supplied from the inverter circuit 13 to the synchronous motor 14, thus eliminating the braking force (torque) between the stator 50 and the permanent magnet 46 (outer rotor).

As the case may be, some external force or the driver's failure of using (applying or activating) the hand brake 19 on a slope causes the thus stopped electric vehicle to move by accident (unintentionally).

According to the first embodiment of the present invention, the turned off switch 12 (open) can keep the contact 24 turned on (closed). With the contact 24 thus turned on (closed), the current can flow to the relay 22. In this case, a voltage charged in the double layer capacitor 23 can act as a power source of the thus flowing current. As a result, the relay 22 is energized, and thereby closes the contact RY. Thereby, the controlling power can be supplied again to the controller 30 by way of the contact RY of the relay 22. Thereby, the controlling power can be secured for the controller 30 and the position detector 20.

In sum, in case that the electric vehicle should start moving by accident on the slope or the like, such accidental travel of the electric vehicle can be detected, thereby turning on the switching element TRX, the switching element TRY and the switching element TRZ which three are disposed on the negative arm (pole) of the inverter circuit 13, resulting in short circuits of the phase terminal U (with the switching element TRX), the phase terminal V (with the switching element TRY) and the phase terminal W (with the switching element TRZ) of the synchronous motor 14.

In the above state that the short circuit caused to the switching element TRX, the switching element TRY and the switching element TRZ {which three are disposed on the negative arm (pole) of the inverter circuit 13}, the accidental travel of the electric vehicle may cause an inductive voltage to the stator winding 43 of the synchronous motor 14. The inductive voltage may cause a short circuit current Iu, a short circuit current Iv and a short circuit current Iw, thus generating the braking force (torque).

When the electric vehicle makes a stop, however, the inductive voltage will be eliminated, leading to elimination of the braking force (torque). In case that a further external force should apply to the electric vehicle at this point in time, the electric vehicle will make a further travel accompanied by another braking force (torque) simultaneously.

The above summarizes that the driver's safety can be assured even when the driver fails to use (apply or activate) the hand brake 19 on the slope. Not causing acceleration, the electric vehicle in this case can make eased and repeated operations, that is, travels and stops, so as to assure the driver's safety.

Figure 5:
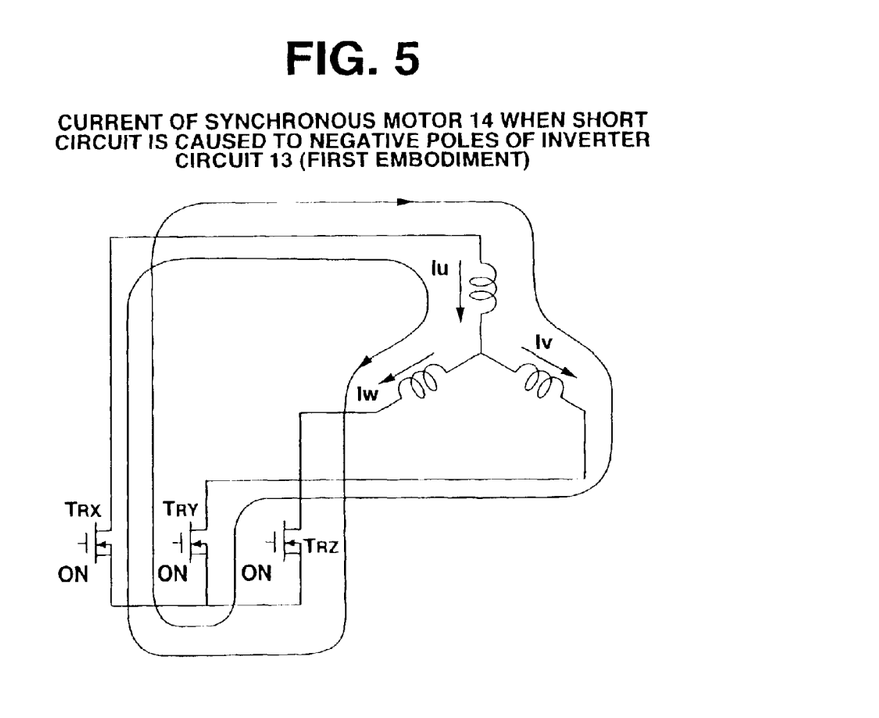
FIG. 5 shows a current signal Iu, a current signal Iv and a current signal Iw of a synchronous motor 14 when a short circuit is caused to a negative poles of the inverter circuit 13, according to the first embodiment.

The short circuits in FIG. 5 can be caused to the phase terminal V, the phase terminal V and the phase terminal W of the synchronous motor 14 by turning on respectively the switching element TRX, the switching element TRY and the switching element TRZ of the inverter circuit 13.

Figure 6:
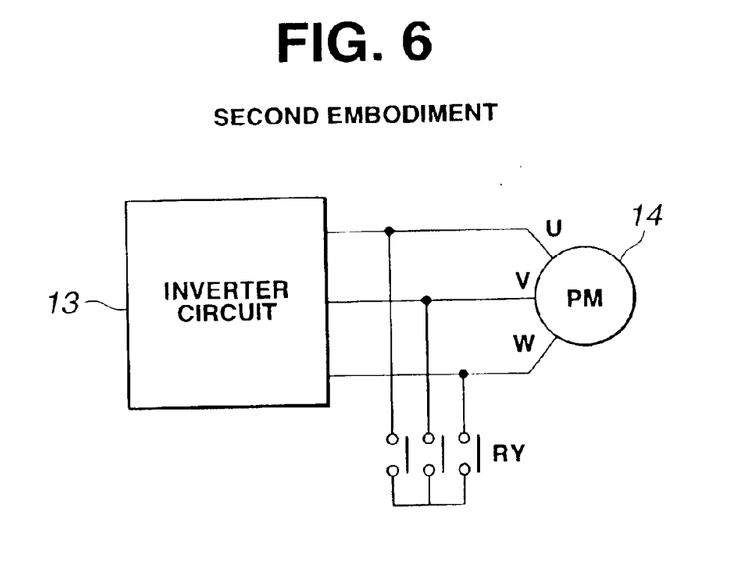
FIG. 6 shows a construction of an apparatus of controlling an electric vehicle, according to a second embodiment of the present invention.

As is seen in FIG. 6 there is provided a construction of the apparatus of controlling the electric vehicle, according to a second embodiment of the present invention.

As compared with FIG. 5, FIG. 6 shows that the contacts RY of the relays 22 connect respectively to the phase terminal U, the phase terminal V and the phase terminal W of the synchronous motor 14, such that turning off the switch 12 can close the contacts RY so as to cause the short circuits to the phase terminal U, the phase terminal V and the phase terminal W.

Although the present invention has been described above by reference to certain embodiments, the present invention is not limited to the embodiments described above. Modifications and variations of the embodiments described above will occur to those skilled in the art, in light of the above teachings.

The entire contents of basic Japanese Patent Application No. P2001-295229 (filed on Sep. 27, 2001 in Japan) is incorporated herein by reference, in order to take some protection against mis-translation or omitted portions.

The scope of the present invention is defined with reference to the following claims.

What is claimed is:

1. A method of controlling an electric vehicle which is so constituted as to drive a synchronous motor by way of a switch and an inverter circuit, a battery acting as a source of driving a controlling power, the synchronous motor having a permanent magnet acting as an outer rotor, the method comprising the following operations of:
   1) detecting that the electric vehicle has an acceleration signal of zero;
   2) detecting that an actual speed of the electric vehicle is less than a predetermined percent of a rated speed;
   3) supplying a current to a winding of a fixed phase of the synchronous motor, by way of the inverter circuit; and
   4) generating a braking force,
   wherein a capacitor is disposed between a first power source terminal and a second power source terminal of a position detector for detecting a rotary position of the permanent magnet of the synchronous motor,
   a relay which is energized when the switch is open is disposed in parallel with the capacitor, and the controlling power is supplied from the battery to a controller of the inverter circuit by way of a contact of the relay.

2. The method of controlling the electric vehicle as claimed in claim 1, wherein the current supplied to the winding of the fixed phase of the synchronous motor is controlled by turning on a first predetermined switching element of a fixed phase of the inverter circuit while turning off a second predetermined switching element of the fixed phase of the inverter circuit.

3. The method of controlling the electric vehicle as claimed in claim 1, wherein when the battery acting as the source of driving the controlling power is cut off, the electric vehicle causes a short circuit to a terminal of the synchronous motor in case that an external force is so applied to the electric vehicle as to start moving the electric vehicle, and an inductive voltage caused to the winding of the synchronous motor allows the current to flow in the winding of the synchronous motor, to thereby generate a braking torque.

4. The method of controlling the electric vehicle as claimed in claim 3, wherein the short circuit of the terminal of the synchronous motor is caused by turning on the switching element which is disposed at a negative pole of the inverter circuit.

5. The method of controlling the electric vehicle as claimed in claim 3, wherein the short circuit of the terminal of the synchronous motor is caused by closing a contact of a relay when the switch is open.

6. The method of controlling the electric vehicle as claimed in claim 1, wherein the predetermined percent is 10 percent.

7. The method of controlling the electric vehicle as claimed in claim 6, wherein the predetermined percent is in a range from 5 percent to 8 percent.

8. The method of controlling the electric vehicle as claimed in claim 7, wherein the predetermined percent is 5 percent.

9. An apparatus of controlling an electric vehicle, comprising:

1) a battery acting as a source of driving a controlling power;

2) a synchronous motor connected to the battery by way of a switch, the synchronous motor having a permanent magnet acting as an outer rotor and having a position detector; and 3) an inverter circuit interposed between the synchronous motor and the battery, the inverter circuit including a controller which outputs a control signal for controlling the synchronous motor, the controller comprising:

a) a brake speed detector receiving a speed signal and an acceleration signal of the electric vehicle, and carrying out a first detection for detecting that the acceleration signal is zero and a second detection for detecting that an actual speed of the electric vehicle is less than a predetermined percent of a rated speed;

b) an optimum current command operator receiving the first detection and the second detection carried out by the brake speed detector, and setting up a current signal for generating a braking torque; and c) a pulse width modulation signal generator receiving the first detection and the second detection carried out by the brake speed detector, and selecting a switching element of a fixed phase of the inverter circuit, wherein the controller is a microcomputer, and the controller further comprises:

a speed detector receiving a position signal from the position detector;

a proportional integral controller receiving an acceleration signal from an accelerator, corresponding to an angle of the accelerator;

a 3/2 phase coordinate converter receiving the speed signal from the speed detector, and a current signal from a current detector, and then making a conversion from a 3-phase coordinate to 2-phase coordinate;

a d/g-axis current controller controlling a d/a-axis current after receiving the following signals;

1) the current signal from the optimum current command operator, 2) the speed signal from the speed detector, and 3) a current signal from the 3/2 phase coordinate converter;

a dead time compensator receiving the current signal from the optimum current command operator; and a 2/3 phase coordinate converter receiving a voltage signal from the d/g-axis current controller for a conversion to three phases.

10. The apparatus of controlling the electric vehicle as claimed in claim 9, wherein the predetermined percent is 10 percent.

11. The apparatus of controlling the electric vehicle as claimed in claim 10, wherein the predetermined percent is in a range from 5 percent to 8 percent.

12. The apparatus of controlling the electric vehicle as claimed in claim 11, wherein the predetermined percent is 5 percent.

* * * * *